Jan. 13, 1925.
J. J. MORAND
1,522,969
METHOD AND APPARATUS FOR FORMING A COMBINATION FELLY AND CUSHION UNIT
Original Filed March 19, 1923
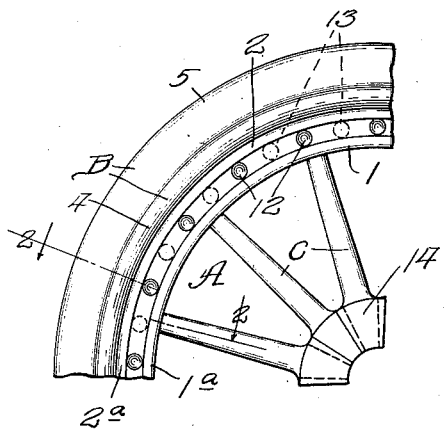
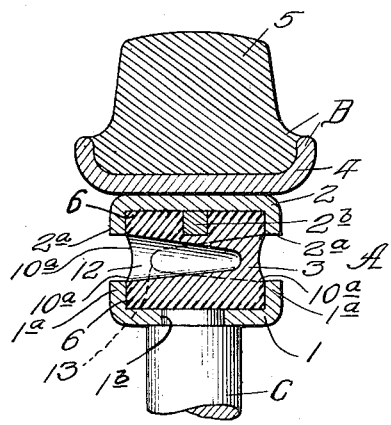
Inventor:
Joseph J. Morand,
By Byrnforth Lee, Clinton & Wiles,
Attys.

Patented Jan. 13, 1925.

1,522,969

UNITED STATES PATENT OFFICE.

JOSEPH J. MORAND, OF CHICAGO, ILLINOIS, ASSIGNOR TO MORAND CUSHION WHEEL CO., OF CHICAGO, ILLINOIS, A CORPORATION OF ILLINOIS.

METHOD AND APPARATUS FOR FORMING A COMBINATION FELLY AND CUSHION UNIT.

Original application filed March 19, 1923, Serial No. 626,069. Divided and this application filed July 18, 1924. Serial No. 726,748.

*To all whom it may concern:*

Be it known that I, JOSEPH J. MORAND, a citizen of the United States, residing at Chicago, in the county of Cook and State of Illinois, have invented a new and useful Improvement in Methods and Apparatus for Forming a Combination Felly and Cushion Unit, of which the following is a specification.

This invention relates particularly to a method of an apparatus for forming a combination felly and cushion-unit for use in a cushion wheel, in which an elastic rubber cushion-element is secured between the felly and the tire of the wheel.

The primary object is to provide an improved method and apparatus for manufacturing such cushion-unit.

The present application constitutes a division of my pending application No. 626,069, filed March 19, 1923.

The invention is illustrated in its preferred embodiment in the accompanying drawing, in which—

Fig. 1 represents a broken elevational view cushion wheel constructed in accordance with the invention; Fig. 2, a broken sectional view taken as indicated at line 2 of Fig. 1; Fig. 3, a sectional view illustrating the manner in which rubber is introduced into the channels employed, preparatory to a vulcanizing operation to form a combined cushion-unit and felly; Fig. 4, a sectional view illustrating the molding or vulcanizing operation; and Fig. 5, a broken sectional view in the nature of a development, illustrating the mold-section employed.

In the construction illustrated A represents a combination felly and cushion-unit; B, a tire applied thereto; and C, C spokes connected with the unit A.

In accordance with the present method, the cushion-unit A comprises a heavy endless substantially rigid steel band 1, which preferably is of U-form cross-section and which serves both as an inner cushion-rim and as a felly; a heavy substantially rigid outer steel rim 2, which preferably is of U-form cross-section; and an endless annular rubber cushion member 3 vulcanized in situ between the cushion-rims.

In the preferred form, the member 1 has outturned flanges $1^a$, and the member 2 has inturned flanges $2^a$. Preferably also a heavy steel ring $2^b$ is inserted in the member 2 and disposed at an intermediate point, thus providing an intermediate stiffening rib or flange. The rims 1 and 2 are made of heavy enough stock so as to be substantially inflexible; and the rim 2 is encircled by the tire B, which comprises a heavy steel band 4 and the rubber tread 5. The tire B gives additional strength to the outer cushion-rim, so that the inflexibility of the outer cushion-rim is additionally assured.

The members 1 and 2 may be rolled from heavy sheet steel into annular form, welded at the joint, and flanged to provide the U-form cross-section.

In the manufacture of the combined cushion-unit and felly A, the rims are first thoroughly cleansed by processes which need not be here described, so that all grease and scale are removed. The interiors of the channels are then preferably given a thin coating of copper by suitable process. The interior surfaces of the channels are then coated with a rubber cement. Sheets of hard rubber compound are then introduced into the channels adjacent the inner surfaces, these sheets being designated 6; layers of soft rubber compound 7 are then introduced to fill the channels to the level of the edges of the flanges, as shown in Fig. 3; and additional triangular sheets or strips 8 of soft rubber compound are then introduced between the channels, completely filling the space, as shown in Fig. 3. These triangular strips are introduced from opposite sides, as will be evident from Fig. 3.

For vulcanizing purposes, the annular channels 1 and 2 serve as mold-sections. These are embraced by heavy annular mold-sections 9, as shown in Fig. 4. The mold-sections 9 are suitably recessed at their inner sides to accommodate the cushion-unit A. Each mold-section 9 is provided at its inner surface, in the recessed portion, with an annular bead 10, which serves to give the sides of the rubber member 3 the concavities $10^a$ shown in Fig. 2. Each mold-section 9 is equipped with a series of tapered steel pins or studs 11 which have base portions 11ᵃ fitting in counter-sinks with which the annular beads 10 are provided. The pins 11 also have the reduced shanks 11ᵃ fitted in holes in the mold-sections.

The taper-pins 11 of one mold-section are staggered with relation to those of the other mold-section. That is, the pins of one section are spaced intermediately with respect to the pins of the other mold-section, so that after the molding operation, the annular rubber member 3 is provided at one side with a series of equally spaced holes 12, which alternate with equally spaced holes 13 extending in from the other side.

It will be noted from Fig. 3 that the triangular layers of rubber 8 fill the space which lies between the flanges of the rims and project somewhat. The purpose is to provide somewhat more than enough rubber to form the vulcanized rubber member 3. When the mold-plates 9 are forced together, the rubber is forced into the space between the rims and is crowded into the channels. The taper-pins 11 aid materially in forcing the rubber into the channels. In practice, the mold-plates 9 are placed under heavy pressure so that they will be held properly in place. This may be accomplished by suitable clamping means (not shown); or it may be accomplished by stacking the molds in a vulcanizer and applying suitable pressure. The rubber is cured by admitting live steam or applying heat in any suitable manner.

In practice, some excess of rubber is provided in loading the rims preparatory to applying the lateral mold-plates 9. In the vulcanizing operation, excess rubber may exude at the edges of the flanges 1ᵃ and 2ᵃ, thus forming thin fins which may be trimmed off after the cushion-unit has been removed from the mold and cooled. In the vulcanizing operation, the rubber is caused to adhere with great tenacity to the cushion-rims at all points of contact. It has been demonstrated that by the method stated the rubber cushion-member is so firmly bound to the cushion-rims at all points of contact as to enable the cushion-member to effectively withstand the stretching action to which the rubber member may be subjected in use.

After the combination cushion-unit and felly A have been produced in the manner described, the spokes and tire are applied. Preferably the spokes are applied first, although the order may be reversed.

The preferred method of applying the spokes is to provide the metal felly 1 with an annular series of spoke-sockets 1ᵇ, and then introduce the spoke C, the spokes being provided at their outer ends with tenons which fit into the sockets. The sockets 1ᵇ for the tenons of the spokes are preferably in form of perforations provided by boring out the metal after the cushion-unit has been formed. This is the most convenient method inasmuch as it would be necessary, were the holes to be punched prior to the vulcanizing operation, to plug up the holes so that the rubber would not exude therethrough during the vulcanizing operation. Were the sockets to be formed, however, by simply punching the metal outwardly to produce depressions at the inner circumference of the felly for receiving the tenons, the metal remaining unsevered, it would then be possible to form the sockets before introducing the rubber.

Where the spokes are of wood, as in the illustration, it is preferred to provide the inner ends of the spokes with truncated arrow heads 14 which are beveled laterally, the beveling of alternate spokes being in opposite directions. The hub-portions of the spokes are partially nested, the tenons being directed into the sockets therefor. The hub-portions of the spokes are then forced into the same plane by application of great pressure. By reason of the arched arrangement of the hub-portions of the spokes, the spokes are forced radially outward during the operation of forcing their hub-portions into the same plane. By employing proper bevels, the spokes may be so wedged together that they will remain in the same plane, while the spokes themselves are under heavy compression longitudinally, so that a very firm wheel-center results. Hub-plates and barrels may be applied according to desire, none being shown.

In the use of the improved wheel, the annular endless rubber cushion-member 3 is subjected to compressive and distensive elastic action throughout the circumference of the structure. Thus, when the wheel-center is depressed, the rubber cushion-element may be compressed throughout the lower portion of the wheel and will be stretched or distended throughout the upper portion of the wheel.

The staggered lateral recesses 12 and 13 in the rubber cushion-member project past each other in the manner illustrated in Fig. 2. In a wheel having the rubber member 3 of about 24 inches in diameter, it is preferred to place the lateral recesses at each side about five inches apart, so that in the combined arrangement of the recesses, the distance between recesses is approximately two and one-half inches. When the cushion-unit cools, the steel members and the rubber member do not contract at the same rate. Provision of the lateral recesses or perforations enables the cushion-member to adjust itself to the resulting stresses without danger of rupturing the rubber or detaching it from its anchorage in the cushion-rims. The tendency is for the recesses to elongate themselves somewhat circumferentially. This tendency is more noted if the distance between the perforations is increased. In the use of the wheel, when the wheel-center is depressed, the recesses throughout the lower portion of the rubber-member are flattened or elongated circumferentially, while those at the upper portion of the wheel are stretched or elongated vertically. The cushion-member is suitably resilient in a lateral direction also, but sufficiently strong to resist any undesirable deformation of the wheel by lateral pressure.

In practice, the tire is forced on to the outer cushion-rim 2 by a pressure of many tons, so that it virtually becomes integral with the cushion-rim, so far as function is concerned, and strongly reenforces the outer cushion-rim. The tire, in turn, is reenforced by the outer cushion-rim.

The method described enables an exceedingly durable and efficient cushion wheel to be produced at moderate cost. Also, the improved wheel may be made of considerably lighter construction than is necessary where the rubber cushion-member is bolted to the flanges of the cushion-rims. Moreover, by reason of the use of the vulcanized anchorage of the rubber to the rims, it is possible to use considerably less rubber and still gain the same resilience.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is:

1. The method of producing a cushion-unit for a cushion wheel which comprises applying layers of vulcanizable rubber compound to the inner side of an outer cushion-rim and the outer side of an inner cushion rim, introducing oppositely turned triangular strips of vulcanizable rubber compound in the space between the circumferential planes of the flanges of said rims, introducing the assembled parts into a mold, and subjecting the structure to a vulcanizing operation.

2. The method of forming a cushion-unit for cushion wheels which comprises loading inner and outer channel-form cushion-rims with vulcanizable rubber compound, introducing additional vulcanizable rubber compound to fill the space between the circumferential planes of the edges of the flanges of said rims, introducing the unit between annular lateral mold-plates provided with annular ribs which project through the space between the flanges of the cushion-rims and provided also with cavity-forming pins which project inwardly from said ribs, and subjecting the structure to a vulcanizing operation.

3. The method of producing a cushion-unit for a cushion wheel which comprises applying layers of vulcanizable rubber compound to the inner side of an outer cushion-rim and the outer side of an inner cushion rim, applying to the loaded inner rim a vulcanizable strip having a laterally tapered outer surface, applying within the loaded outer rim a vulcanizable strip having a laterally tapered inner surface, bringing the parts together in proper relation, the strips being of sufficient width to afford excess material, introducing the assembled parts between mold-plates having their inner surfaces equipped with annular ribs adapted to fit between the flanges of the rims, and subjecting the structure to a vulcanizing operation.

4. Vulcanizing means for use in the manufacture of cushion-units for cushion wheels, comprising annular lateral mold-plates having flanges for embracing the circumferential portions of inner and outer cushion-rims and having annular beads for engaging the lateral surfaces of rubber cushion-elements and having projecting taper-pins extending inwardly from said annular beads, the pins of one mold-plate alternating with those of the other mold-plate.

JOSEPH J. MORAND.